M. E. A. BAULE.
APPARATUS FOR TRACING THE ROUTES OF WARSHIPS AND MERCHANT VESSELS.
APPLICATION FILED JULY 14, 1920.

1,433,595.

Patented Oct. 31, 1922.
5 SHEETS—SHEET 1.

Inventor
M. E. A. Baule,
By
H. R. Kerslake
Attorney

M. E. A. BAULE.
APPARATUS FOR TRACING THE ROUTES OF WARSHIPS AND MERCHANT VESSELS.
APPLICATION FILED JULY 14, 1920.
1,433,595.  Patented Oct. 31, 1922.
5 SHEETS—SHEET 2.
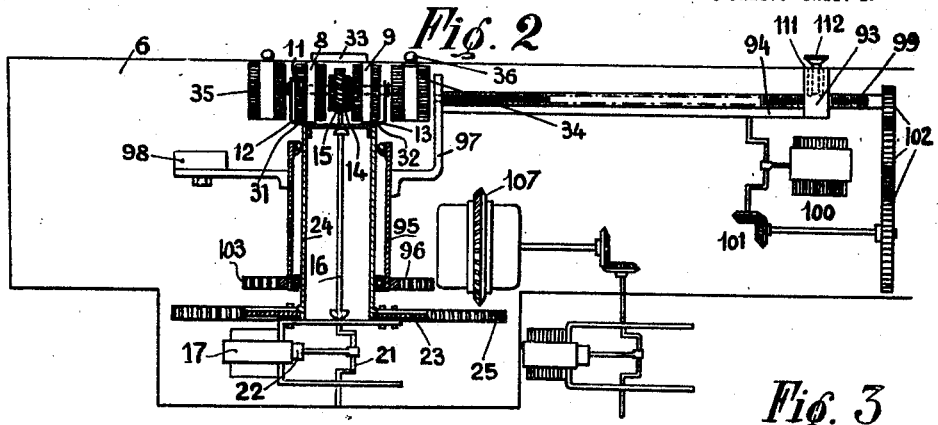
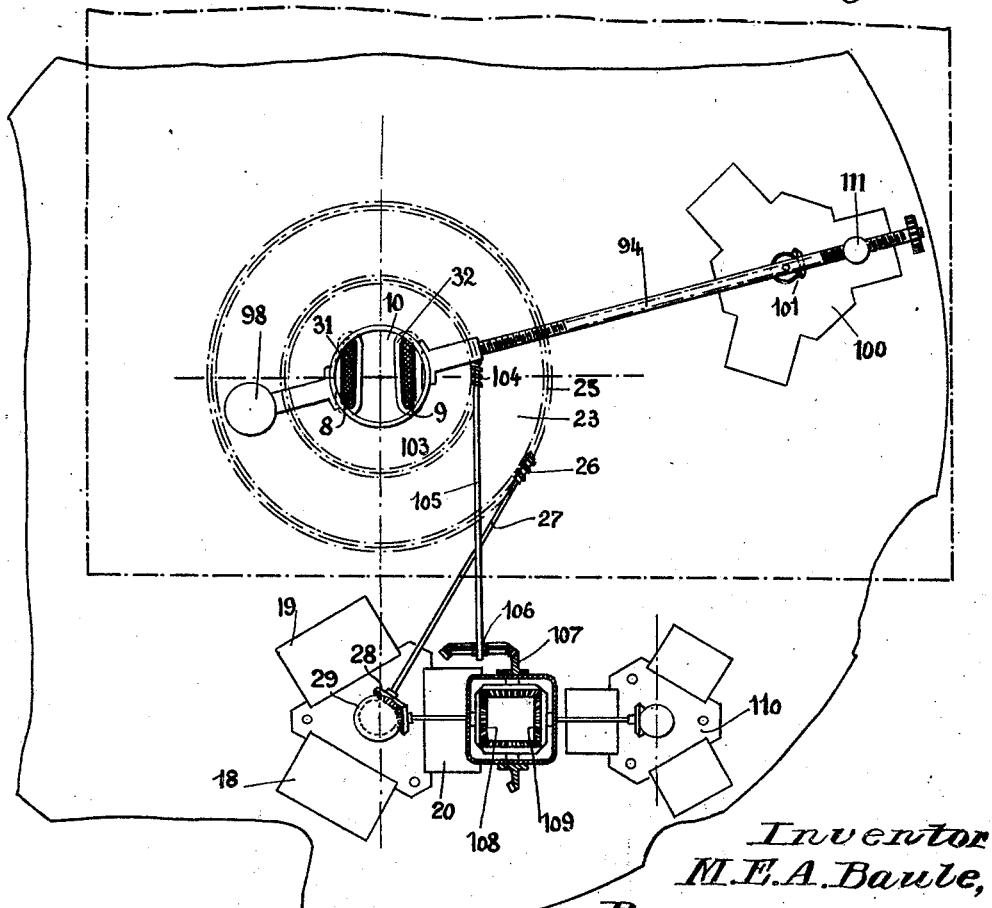

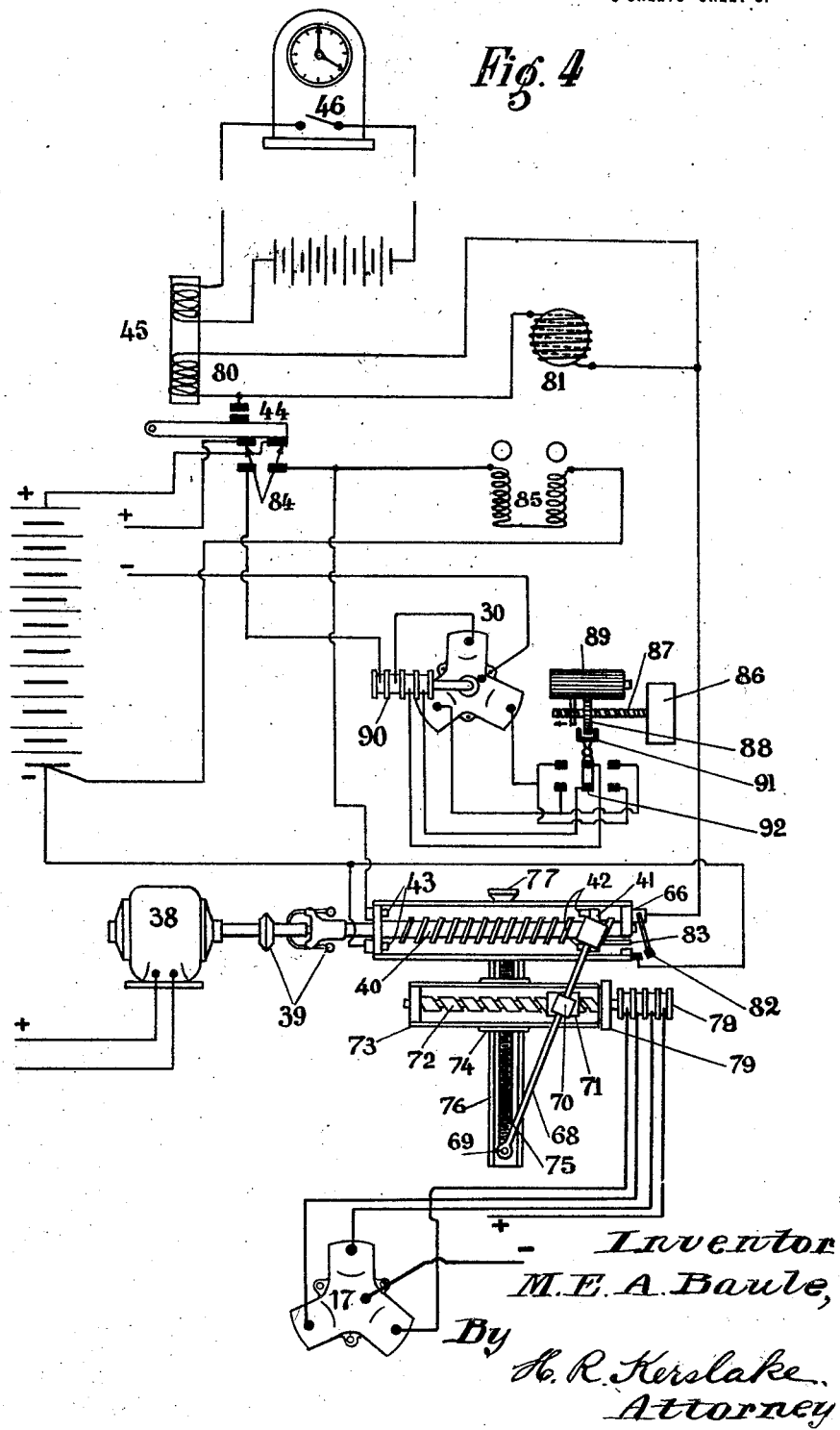

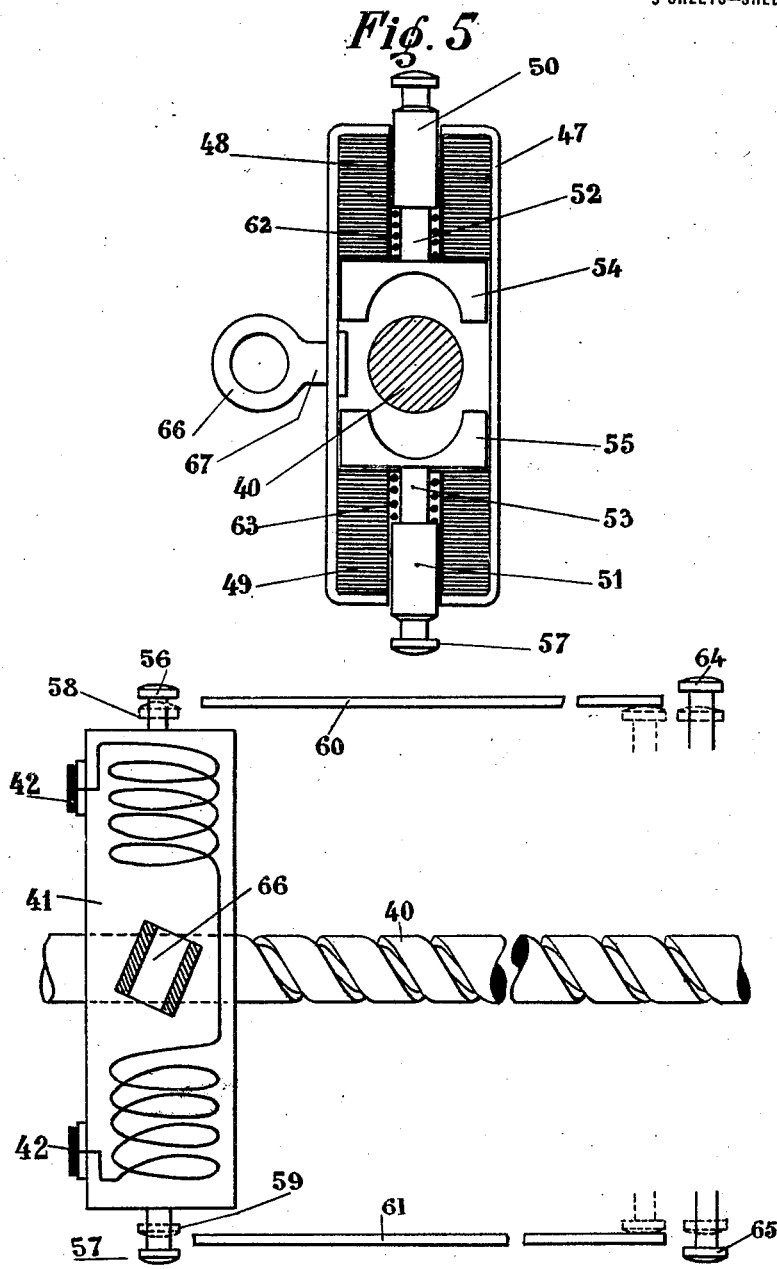

M. E. A. BAULE.
APPARATUS FOR TRACING THE ROUTES OF WARSHIPS AND MERCHANT VESSELS.
APPLICATION FILED JULY 14, 1920.

1,433,595. Patented Oct. 31, 1922.
5 SHEETS—SHEET 5.

Inventor
M. E. A. Baule,
By H. R. Kerslake,
Attorney

Patented Oct. 31, 1922.

1,433,595

UNITED STATES PATENT OFFICE.

MARIE EMILE ALFRED BAULE, OF ST.-CYR, FRANCE.

APPARATUS FOR TRACING THE ROUTES OF WARSHIPS AND MERCHANT VESSELS.

Application filed July 14, 1920. Serial No. 396,272.

*To all whom it may concern:*

Be it known that I, MARIE EMILE ALFRED BAULE, a citizen of the French Republic, of St.-Cyr au Mont d'Or Rhone, France, have invented new and useful Improvements in Apparatus for Tracing the Routes of Warships and Merchant Vessels; and I do hereby declare the following to be a full, clear, and exact description of the same.

The present invention has for its object to provide an apparatus for automatically tracing the course or route of a ship. It comprises a fixed stylus and a movable card which is displaced parallel to itself on a table, without changing its orientation in relation to the ship. This displacement is effected by means of two milled wheels which are given a speed of rotation proportional to the speed of the ship and in a direction opposite to such speed, the milled wheels remaining constantly oriented in space in such manner as to make at each instant with the head of the ship an angle equal to that of the geographical direction of the route.

There has previously been proposed a number of route tracing devices which may be divided into two classes, those employing a fixed card, and the others employing a movable card. In the first class the stylus is carried by a self moving member capable of displacing itself in all directions on the upper surface of a card. But this self moving member, more or less heavy and subjected to shocks, vibrations, and the rolling or pitching of the ship, is often liable to slip and spoil the trace. In addition it hides the most interesting portion of the trace and consequently hinders the various operations which it may be desired to effect on the card. In the devices hitherto proposed having a movable card intended to obviate these disadvantages, the card is subjected to two movements, a movement of translation according to the speed of the ship, and a movement of rotation according to the changes of direction of the ship's head. Consequently the orientation of this card is constantly changing which may be a cause of difficulty and error.

In the tracing device according to the present invention the above disadvantages are avoided by the fact that the card is only given movements of translation and consequently constantly preserves its initial orientation, which facilitates the various readings and intersections. It follows also that the movement of this card may take place at several points at once, in the manner of a plate in a rolling mill the movement in these conditions being perfect and not permitting any uncontrolled sliding movements of the card which could be produced in the case of a single milled wheel being employed. Further, owing to electromagnetic devices assuring the position of the card, organs hindering the vision are reduced to a minimum in the present apparatus.

For warships where it is often useful to trace simultaneously the route followed by one or two enemy ships, principally for the firing of torpedoes, the apparatus according to the present invention further comprises:—

1. An arrangement allowing the inscription on the card of the route of the target of which the distance is ascertained by means of a telemeter, and the bearing by means of a telescope.

2. A device allowing the immediate deduction in a continuous manner, from the trace of the route of the target, of the necessary elements for the launching of torpedoes.

The complete apparatus is hereinafter described, the last mentioned devices being capable of omission in the case when the trace of the route of the target is not necessary; the cumbersomeness of the apparatus is then considerably reduced.

For greater convenience in the description the ship which carries the apparatus will be called the "firing vessel," and that of which the distance and bearing are observed the "target vessel."

All the parts of the apparatus are enclosed in a flat box supported by a pedestal, forming a table on which the card is placed. At the centre of this table is provided a moving organ which displaces the card at each instant in a direction opposite to the route followed, but without changing its orientation, with a speed proportional to the speed of the firing vessel. A fixed tracing organ, placed also at the centre, marks on the card the route of the firer by resolving it into a polygon of a sufficiently large number of sides for it to be practically identical with the curved route which the firer follows.

One or two arms pivoted about the centre are continually oriented automatically along the geographical bearing of the target or of the two targets. On each arm a cursor is automatically displaced according to the indications of the corresponding target furnished by the range finder. A tracing organ carried by this cursor marks on the card, either to the same scale as for the firer, or to a reduced scale, the route of the target vessel.

By way of example an apparatus for carrying the invention into effect is described below and illustrated by the attached drawings, wherein:—

Figure 2 is a vertical axial section of the apparatus, the box being assumed in a horizontal position.

Figure 3 is a plan view, the upper plate of the box being removed.

Figures 4, 5, 6, 7, 8 and 9 are views showing details of the apparatus.

Figure 1:
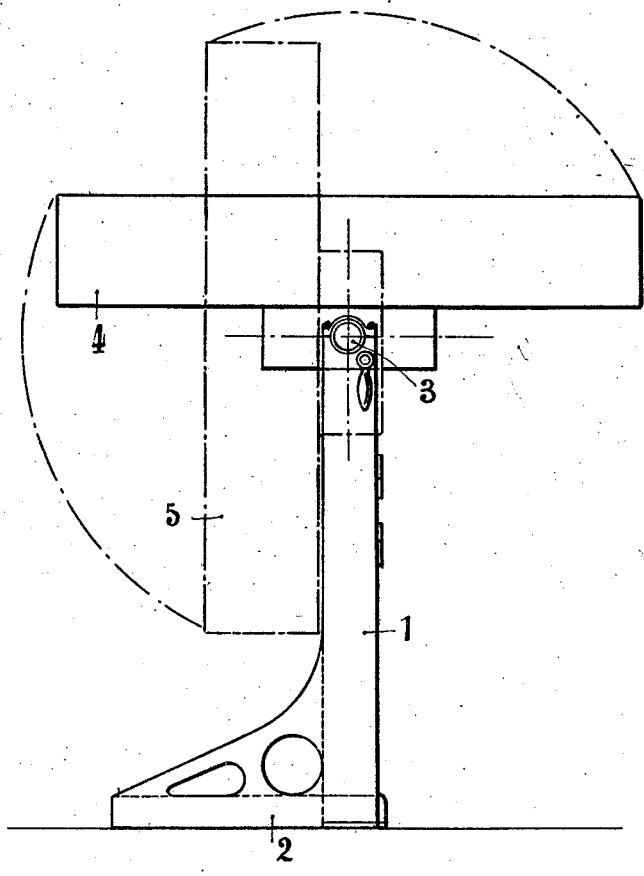
Figure 1 is a view of the complete apparatus.

The apparatus consists (Figure 1) of a pedestal 1, fixed by its base 2, and supporting by a pivot 3 a flat box 4 enclosing all the organs. This box may occupy any position, from the horizontal position 4 shown in full lines, which is the working position, up to the vertical position 5 shown in dot and dash lines, which is the position of rest and of least obstruction.

On the upper face 6 of the box is placed the card 7 (Figure 3) oriented in the usual direction, that is to say north–south in relation to the observer seated before the apparatus.

For the greater convenience of explanation, the different organs of the apparatus have been here-below divided into two groups, according to their function; those which move the card to trace the route of the firer, and those which co-operate in tracing the route of the target; the device for the firing of the torpedoes is then described.

*I. Tracing the route of the firing vessel.*

The organs for moving the card consist of two milled wheels 8 and 9 (Figures 2 and 3) of which the upper parts are flush with the top 6 of the box at its centre, in a circular opening 10, provided for the purpose. These milled wheels are keyed on a shaft 11, supported by bearings 12, 13 and carrying at its centre a worm wheel 14 controlled by an endless screw 15. This endless screw 15 is moved by the intermediary of a cardan shaft 16, by an impulsion motor 17 which will be referred to by the term "card motor."

The impulsion motor 30 shown is of the kind invented by the applicant, which formed the subject-matter of U. S. Patent No. 1,347,002 granted on July 20th, 1920. It consists of three similar electro-magnetic devices 18, 19, 20, placed at 120° around a crank shaft 21, each of them comprising a movable core 22, attached by a connecting rod to the crank 21. The motor receives, in a given invariable time, by means of a device which will be described later, a number of impulses proportional to the speed of the firing vessel so that the milled wheels 8 and 9 rotate at a speed proportional to that of the vessel.

In order that the card, whose orientation is fixed in relation to the ship, that is to say varies in space with the head of the ship, may be correctly moved in the direction opposite to the route which the firer follows, it is necessary that the milled wheels 8 and 9 should remain oriented in space so as to make at each instant with the head of the vessel (which is in line with the north–south direction of the card), an angle equal to that of the geographical direction of the route, i. e., to that of the head of the vessel with the true north–south direction. For this purpose the motor 17 is mounted on a plate 23 fast to the sleeve 24 which carries the bearings 12 and 13 of the spindle 11 of the milled wheels. The plate 23 carries on its edge teeth 25; its rotation is controlled by an endless screw 26 (Figure 3), which terminates the spindle 27, the pinion 28 of which is operated by a horizontal pinion 29 keyed on the shaft of the impulsion motor 30 which will hereinafter be referred to under the name of "head motor." This head motor is operated by means of one of the compasses on board of which it follows the displacements, by means of a repeating apparatus of any known kind. It follows that the plate 25, and consequently the wheels 8 and 9 are oriented in relation to the north–south direction of the card as the head of the firing vessel is oriented in relation to the true north–south direction, and as these wheels turn at a speed proportional to the speed of the firing vessel, the card will be moved by the milled wheels, parallel to itself, in a direction opposite to the route of the firing vessel, and at a speed proportional to the latter. A fixed tracing device placed at the centre of the table, above the card and not shown, will then mark on the card the route of the firing vessel.

The movement of the card by the wheels 8 and 9 is effected by the following device:—

The wheels 8 and 9 are surrounded by coils 31 and 32 fixed on the upper surface of the sleeve 24; above the card is freely disposed a cylinder 33, of magnetic metal, which is attracted by the milled wheels when the two coils 31 and 32 are excited. When the milled wheels turn, the card is moved between them and the cylinder 33 as in a rolling mill.

Supporting electro-magnets 34 and 35 are located immediately below the cover 6 of the table, and, above their armatures, rest freely on the card magnetic balls 36 and 37 which are attracted when these electro-magnets are excited and maintain the card stationary. The cylinder 33 and the balls 36 and 37 are held in position on the card when they are not attracted by their electro-magnets, by means of a light cage of suitable form, placed above the card and not shown in the drawings.
At the moment of altering the direction of the head of the firing vessel, while the milled wheels 8 and 9 change their orientation, it is necessary that they should cease to move the card for an instant. For this it is sufficient that their coils 31 and 32 should not be excited, and during that time the card will be nevertheless maintained in place if the electro-magnets 34, 35 are excited.
For this purpose, the distribution of current in the different apparatus is effected in the following manner, according to the diagram of Figure 4.
A motor 38 rotates in a continuous manner and moves a device which will be called "contactor" and which is intended to regulate the speed of the "card motor." This device consists essentially of a controlling clutch 39 formed by two friction cones which are separated from each other at a certain speed by the flying apart of two centrifugal balls. This clutch transmits the movement of the motor to an endless screw 40. The speed of the motor 38 is adjusted once for all to a value slightly greater than that for which the balls act to separate the cones and declutch the screw 40 from the motor 38; there follows a rapid succession of clutchings and declutchings which ensures a practically constant speed of the screw 40 in spite of the usual variations of voltage of the source.
A cursor 41, shown at the right hand end of its path, can be engaged with the screw 40 by an electro-magnetic means hereinafter described and given by this screw a movement of translation, from left to right, up to the position shown in Figure 4. At this moment the cursor 41 is automatically disengaged from the screw 40 and is returned sharply to the left hand end of its path by the action of a counterweight or by a spring not shown on the drawing.
When the cursor has been thus brought back against the left hand abutment, contacts 42 carried by the cursor 41 are applied against contacts 43 carried by the fixed part; this allows electro-magnets 48, 49 (Figure 5), carried by the cursor, to be traversed by impulsions of current emitted at regular intervals by the closing of the contact 44 of the relay 45 itself controlled by the contact 46 of an electric clock.
The operation is as follows: The clock closes the contact 46, the armature of the relay is lifted and closes the contact 44; the current, owing to the contacts 42, 43 passes through the coils 48, 49 of the cursor 41, which causes its disengagement from the screw. The cursor laterally fixed is given a movement of translation up to the right hand end of its path; at this moment the release operates and the cursor is returned to the left where it remains until it receives a new impulse from the clock. It will be apparent that the electric clock producing the control is absolutely independent of the motor which provides the energy necessary to displace the movable organs; this clock having only to establish light electric contacts may therefore have the dimensions and the accuracy of a marine chronometer.
Before describing the rest of the organs moved by this movement the description of the cursor 41 will be completed.
It consists (Figure 5) of a metal casing 47 supporting two electro-magnetic coils 48, 49; the soft iron cores 50, 51 of these coils carry at their inner ends rods of brass 52, 53 which each terminate in a nut portion 54, 55, adapted to engage with the screw 40.
It will be seen that if current is passed simultaneously through the coils 48, 49, the cores 50, 55 will place themselves in the middle of the field and the two nut portions 54, 55 will close on the screw 40 which will give the whole a movement of translation, sliding guides, not shown preventing all rotation of the cursor. The two coils are in series with each other, and the current passes in and out by the contacts 42 when they are applied against the contacts 43.
The cursor being moved by the screw the contacts 42, 43, are separated and the current is interrupted, but the portions of the nut remain in engagement with the screw owing to the following device:—
The armatures 50, 51 terminate, on the outer side, in studs 56, 57, which, when the parts of the nut are in engagement with the screw, occupy the positions 58, 59. The movement of translation of the cursor commencing, the studs are maintained in these positions by the fixed bars 60, 61; they are pressed against the inner edges of these bars by the action of springs 62, 63; the cursor continues its movement up to the right hand end of its path; at this moment the studs 56, 57 arrive before openings in the bars 60, 61; the springs 62, 63 can then act to disengage the nut portions from the screw and the movement ceases; the studs then occupy the positions 64, 65 and they will remain hooked over the outer edge of the bars 60, 61 during the return movement of the cursor brought sharply back by the counterweight.
The cursor is again in its initial position until it receives a new impulse from the clock.
The movement of the cursor being thus defined, the action of the rest of the organs will be described.

The cursor carries a kind of ring or yoke 66 capable of turning freely about the axis 67. In this yoke slides a rod 68 capable of oscillating around an axis 69 carried by a fixed part of the apparatus.

It will be seen that this rod moved by the cursor performs continual oscillations about the axis 69 whilst sliding in the yoke 66 which will take at each instant on its axis 67 the desired orientation.

A second yoke 70, similar to the first, is mounted on the nut 71 of a screw 72 which supports the case 73.

The step of this screw is sufficiently long for the movement of the nut 71, moved by the rod 68, to have the effect of rotating the screw 72; this movement is in every way similar to that known in connection with portable drills.

The casing 73, supporting the screw 72, is fast to a block 74 forming a nut of the screw 75; this nut is fixed laterally by slide bars 76.

On turning by hand, or by a device controlled from a distance, the milled button 77 which terminates the screw 75, the casing 73 can be raised or lowered at will, and the screw 72 can thus be placed at any desired distance from the axis 69.

It is clear that the number of turns of the screw 72, for each oscillation of the cursor 41 will be proportional to the distance of the screw 72 from the axis 69.

One of the slide bars 76, for example, can be graduated in knots, and it will thus be possible to give to the screw 72 a mean speed of rotation, per minute, proportionate to the known speed of the vessel. This arrangement allows all the possible speeds of the card to be obtained in a perfectly continuous manner so that the number of scales employed for the trace is practically unlimited.

For making use of this result there is mounted on the end of the screw 72 a current distributor 78 which transmits to the "card motor" 17 a number of electric impulses per minute proportional to the number of turns of the screw and thus to the speed of the ship.

In order only to have a single direction of rotation of the distributor, there is interposed between the latter and the screw a ratchet wheel 79 which automatically declutches the distributor during the return motion.

During this motion the "card motor" is thus stopped; on the contrary the "head motor" 30 receives current owing to the following device (Figure 4):

The relay 45 which has been excited by the temporary closing of the contact 46 of the clock maintains its armature attracted during the forward motion, in spite of the reopening of this contact, owing to a polarizing winding 80 the circuit of which is closed through an auxiliary source (20 volt battery for example) by the intermediary of the contact 44 and contact 82.

This winding is further in parallel with the exciting coils 81 of the milled wheels 8 and 9, as well as with a contact 82 carried by the fixed part of the contactor, and lifted by a projection 83 of the cursor when it arrives at the right hand end of its path.

This contact breaking the circuit of the polarizing winding of the relay, the latter allows its armature to fall and the current for the milled wheels is interrupted during the return movement. At the same time the lower contacts 84 of the relay 85 are established closing the principal current through the "head motor" 30, as well as the 20 volt current of the battery through the coils 85 of the supporting balls.

The motor 30 is arranged in such a manner as to move the milled wheels back periodically into the direction in space making with the head of the vessel an angle equal to that of the geographical direction of the route.

For this a small impulsion motor 86 (Figure 4) is connected to the network of the compass repeaters; it operates a screw 87 of which the nut 88 is cut exteriorally into the form of a toothed wheel which meshes with the elongated pinion 89. The latter is moved by the "head motor" 30, which can be formed either by an impulsion motor carrying at the end of its shaft its distributor (which permits the motor to rotate in a continuous manner in one direction or in the other, the change of direction being effected by switching over the two wires), or by an ordinary continuous current motor, the direction of rotation of which can be reversed by any desired means.

If the nut 88 is displaced along the screw 87 it moves to one side or the other a fork 91 operating a switch 92, which has the effect of rotating in one direction or the other the "head motor" 30.

As long as the head of the vessel remains fixed the motor 86 performs continuous oscillations about a mean position, this being due to the system of repeating apparatus actually employed in connection with the gyroscopic compasses; the nut 88, which can only turn owing to the fact that the pinion 89 and the motor 30 have a relatively large inertia, oscillates quickly about its mean position, between the arms of the fork 91. The play between the two parts is so adjusted that the switch is not actuated by these oscillations and remains in its position of rest. The motor 30 does not receive current and remains stationary even if the relay establishes the contact for operating it.

If the head of the boat varies, the nut 88 advances on the screw 87 proportionally to the number of degrees which the head has varied. At the same time the switch is placed in a position such that the motor 30 will operate as soon as the relay 45 has established the contact 84.

The direction of rotation of the motor is such that it returns the nut and consequently the switch to their mean positions; the head motor then automatically stops after having performed a number of revolutions equal or proportional to that through which the motor 86 has turned, that is to say, to the variation of the head.

II. *Organs co-operating for the tracing of the route of the target.*

This route is traced by a cursor 93 (Figure 2) which is displaced on an arm 94 pivoted about the centre of the table. At each instant the arm is oriented automatically on the card according to the geographical bearing of the target, and the cursor is displaced on this arm according to the variations of distance of the target furnished by the range finder.

About the sleeve 24, which supports the milled wheels 8 and 9 and the motor 17, is mounted on ball bearings a second sleeve 95 provided at its lower part with a toothed plate 96. On this sleeve is fixed a bracket 97 which supports the arm 94 balanced by a counterweight 98. Along this arm is mounted a threaded rod 99 on which may be displaced the cursor 93 forming a nut. The impulsion motor 100, referred to as "distance motor" supported also by the arm 94, controls the rotation of the threaded rod by means of the conical gear 101 and of the straight gear 102. The teeth 103 of the plate 96 are controlled by an endless screw 104 carried by the end of a shaft 105. This shaft carries at its other end a bevel pinion 106 which is controlled by the external crown wheel 107 of a differential of which one pinion 108 receives its motion from the "head motor" 30 whilst the other pinion 109 receives its motion from a "bearing motor" 110.

The card remaining always oriented, as has been stated, in the direction N–S in relation to the observer, that is to say in a position fixed in relation to the axis of the ship, the position of the arm 94 must correspond on the card to the geographical bearing of the target. This displacement is equal to the angle of the geographical route of the firing ship given by the "head motor" 30 increased or diminished by the angle of bearing of the target in relation to the axis of the firing vessel. This bearing is given by the direction of aim of the range finder, its aiming operating the "bearing motor" 110. The differential 107 combines the movement of these two motors and gives to the arm 94 the desired orientation.

The motor 101, which controls the rotation of the threaded arm 99 and consequently the displacement of the cursor nut 93, is an impulsion motor operated according to the variation of distance between the firer and the target given by the range finder. The cursor is provided at its upper part with an electro-magnet 111 which retains and displaces on the card a magnetic ball 112 supporting a stylus which, by any suitable means, leaves a visible trace on the latter. This trace shows the route of the target.

A supplementary winding of the electro-magnet 111 of the cursor 93 is operated at regular intervals of time by the clock and gives periodically to the ball 112 a slight lateral displacement and produces a characteristic mark on the route of the target. The spacing of these successive points on the card allows the speed of the target to be measured.

The routes of the firer and of the target may be traced on the card to different scales either by modifying the normal speed of the motor of the contactor, or by changing the movable graduation of the slide 76 of the contactor (Figure 4); the distance between the firer and the target will be then transmitted by the distance motor to the card 99 by means of a train of gearing different according to the scale adopted.

It will be obvious that two separate identical means for simultaneously tracing the routes of two objects may be provided, which may be useful in certain cases.

III. *The device for the firing of torpedoes (continuous indicator of the angle of sight).*

Figure 6:
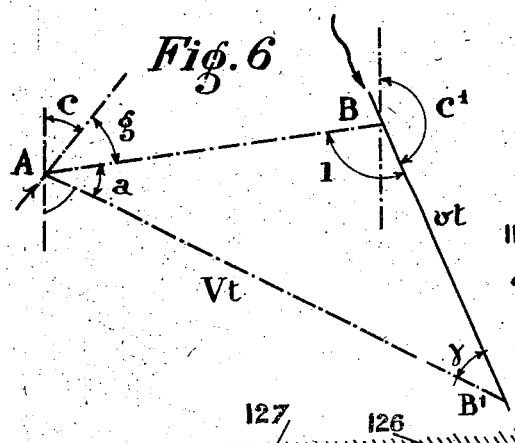

If at a given instant the firing and target vessels are at A and at B (Figure 6), following the routes indicated by the arrows, a torpedo launched by a tube of fixed direction $AB^1$ will proceed to the target if the torpedo and the target take the same time $t$ to reach the point $B^1$.

The angle of sight for the launching of the torpedo is given by the formula $$\operatorname{Sin} a = \frac{v}{V} \times \operatorname{Sin} i$$

$a$ being the angle, $v$ the speed of the target, $i$ the inclination of its route to the line firer-target, $V$ the speed of the topredo.

Now $$\operatorname{Sin} i = \operatorname{Sin}(g + c + c^1)$$

$g$ being the bearing of the target, $c^1$ the geographical angle of its route, $c$ the geographical angle of the route of the firer.

$v$ is measured by the spacing of the successive points of the target route traced on the card. $V$ is known; $(g+c)$ is given by the angular speed represented by the angle through which has turned the shaft 105 which adds together the variations of head and of bearing.

Figure 7:
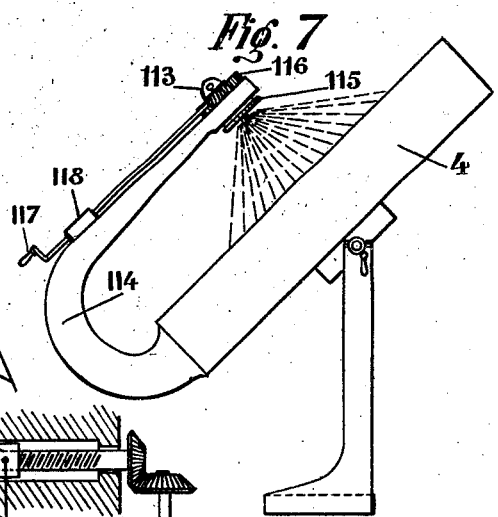

$c^1$ (head of the target) is observed in the following manner:

Above the apparatus, Figure 7, exactly on the perpendicular raised from the centre of the plate 4 is arranged an electric lamp 113 supported by an arm 114 fast to the box of the apparatus. This lamp projects on the card the shadow of a network of very fine and parallel threads. This network 115 placed in front of the lamp is carried by a toothed crown wheel 116 which meshes with an endless screw operable by the crank 117 which also moves a current distributor 118 of the type employed for the impulsion motors.

To measure the angle which the route of the target makes with the direction north–south of the card, the crank and consequently the net is turned until the shadow of one of the threads 115 is tangential with the last element of the route traced or rather to the mean route of the target during the two or three last minutes.

Figure 8:
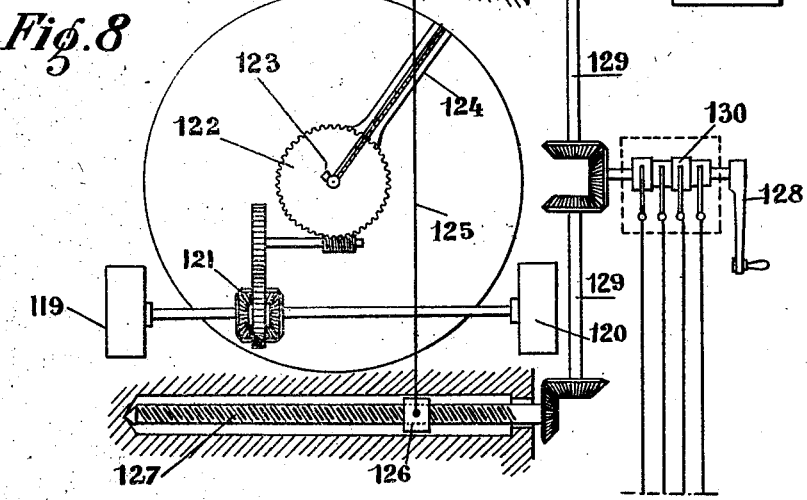

An impulsion motor connected electrically to the distributor will turn the same number of turns; this motor 119, Figure 8, is carried by an apparatus separate from the route tracer proper and which we will refer to under the name of "continuous indicator of the angle of sight".

Another motor 120 receives the impulsions of the distributor mounted on the shaft 105 (Figure 3) and not shown on the accompanying drawings.

The two motors act on a differential 121 which turns by means of pinions, shaft and endless screw, the worm wheel 122 mounted on the spindle 123. This wheel in turning moves an arm 124 carrying a rule graduated in target speeds.

(A more simple mounting could be obtained by placing the arm directly on a plate fast to the crown of the differential.)

In front of this rule can be displaced a thread 125 stretched between the nuts 126 of two screws 127 operated simultaneously by the crank 128 and the transmission means 129.

The shaft of the crank carries a current distributor 130 allowing an impulsion motor 131 (Figure 9) to be placed at a distance.

It will be seen that the number of revolution through which this motor 131 rotates will be proportional to the length of the perpendicular raised from the centre 123 on to the thread 125, that is to say, to $\frac{v}{V} \operatorname{Sin} i$, on condition that the thread passes exactly through the point of the graduation of the rule which corresponds to $v$ and that this graduation should have been made to the scale $\frac{I}{V}$.

V is in effect a constant for a given type of torpedo; it is sufficient to change the movable scale of the rule 124 for projecting torpedoes of another type.

Figure 9:
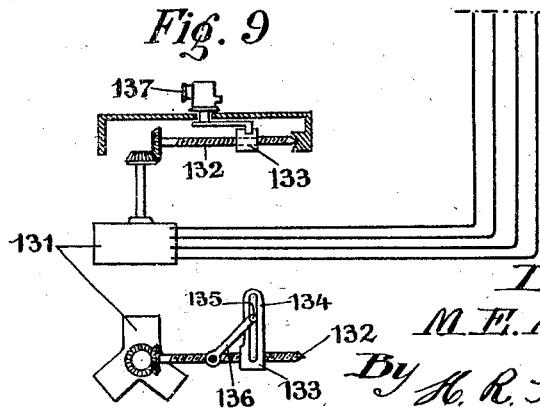

The placing of the thread over the graduation of target speed is effected by a means which operates the crank 128. This operation is utilized to control at a distance the telescopes of the sighting posts or receiving posts at the desired angle for the launching of torpedoes, by means of the following device (Figure 9).

The receiving post comprises an impulsion motor 131 controlled by the distributor 130 and of which the shaft controls an endless screw 132 of which the nut 133 guided so as not to turn moves a slide-guide 134 in which is displaced the pin 135 of a crank 136. The latter turns by transmission of movement the observation telescope 137.

What I claim is:—

1. In an apparatus for automatically tracing the routes of ships, the combination with a fixed stylus of a table, a movable card, and means for giving the said card movements of translation resulting from the speed of the ship and from its orientation in place, whilst preserving the orientation of said card in relation to the ship.

2. In an apparatus for automatically tracing the routes of ships, the combination with a fixed stylus of a table, a movable card, two milled wheels placed beneath the said card and effecting the movement of the said card, means for giving the said wheels a speed of rotation proportional to the speed of the ship and in a direction opposite to such speed, and means for imparting to the said wheels an orientation in space making at each instant with the head of the ship an angle equal to that of the geographical direction of the route of the ship.

3. In an apparatus for automatically tracing the routes of ships, the combination with a fixed stylus of a table, a movable card, two milled wheels placed beneath the said card, means for magnetizing intermittently the said wheels, a magnetic cylinder placed above the said card and the said wheels, means for giving the said wheels a speed of rotation proportional to the speed of the ship and in a direction opposite to such speed, and means for imparting to the said wheels an orientation in space making at each instant with the head of the ship an angle equal to that of the geographical direction of the route of the ship.

4. In an apparatus for automatically tracing the routes of ships, the combination with a fixed stylus of a table, a movable card, two milled wheels placed beneath the said card, means for magnetizing intermittently the said wheels, a magnetic cylinder placed above the said card, and the said wheels, electro magnets placed beneath the said card, magnetic balls resting on the card, above the electromagnets, means for exciting the said electro magnets when the milled wheels are not magnetized, means for giving the said wheels a speed of rotation proportional to the speed of the ship and in a direction opposite to such speed, and means for imparting to the said wheels an orientation in space making at each instant with the head of the ship an agle equal to that of the geographical direction of the route of the ship.

5. In an apparatus for automatically tracing the routes of ships, the combination with a fixed stylus of a table, a movable card, two milled wheels placed beneath the said card and effecting the movement of the said card, a worm screw, a motor imparting a uniform movement of rotation to the said worm screw, a cursor, a clock mechanism effecting intermittently the closure of an electric circuit connecting the cursor with the screw, a spring disconnecting the cursor from the screw, a current distributor operated by the said cursor and whose movement can be controlled in relation to the movement of the said cursor, and an impulsion motor fed by said distributor and giving the rotation to the milled wheels.

6. In an apparatus for automatically tracing the routes of ships, the combination with a fixed stylus of a table, a movable card, two milled wheels placed beneath the said card and effecting the movement of the said card, means for giving the said wheels a speed of rotation proportional to the speed of the ship and in a direction opposite to such speed, a head motor, imparting to the said wheels an orientation in space making at each instant with the head of the ship an angle equal to that of the geographical direction of the route of the ship, and damping means for preventing the oscillations of the milled wheels about their mean position.

7. In an apparatus for automatically tracing the routes of ships the combination with a fixed stylus of a table a movable card two milled wheels placed beneath the said card and effecting the movement of the said card, means for giving the said wheels a speed of rotation proportional to the speed of the ship and in a direction opposite to such speed, means for imparting to the said wheels an orientation in space making at each instant with the head of the ship an angle equal to that of the geographical direction of the route of the ship, and means for tracing the route of a target vessel.

8. In an apparatus for automatically tracing the routes of ships, the combination with a fixed stylus of a table, a movable card, two milled wheels placed beneath the said card and effecting the movement of the said card, means for giving the said wheels a speed of rotation proportional to the speed of the ship and in a direction opposite to such speed, means for imparting to the said wheels an orientation in space making at each instant with the head of the ship an angle equal to that of the geographical direction of the route of the ship, an arm movable about the central axis of the table, a cursor on the arm, means for displacing the said cursor according to the indications of distance from a range finder, a "head" motor, a "hearing" motor and a differential combining the rotation of the said "head" motor with the rotation of the said "hearing" motor, and imparting orientation to the said arm.

In testimony whereof I affix my signature in presence of two witnesses.

MARIE EMILE ALFRED BAULE.

Witnesses:
　JULIAN KEMBLE FRIEDBERG,
　LOUIS ESCHER.